United States Patent Office 3,046,285
Patented July 24, 1962

3,046,285
6-CYANO CORTICAL HORMONES
Albert Bowers and Howard J. Ringold, Mexico City, Mexico, assignors to Syntex S.A., Mexico City, Mexico, a corporation of Mexico
No Drawing. Filed Aug. 25, 1959, Ser. No. 835,848
Claims priority, application Mexico Aug. 26, 1958
21 Claims. (Cl. 260—397.45)

This invention relates to certain new cyclopentanoperhydrophenanthrene derivatives.

More particularly it relates to 6-cyano cortical hormones, and more specifically to the α- and β-sterioisomers of 6-cyanocortisone and -hydrocortisone, which may further have additional double bonds at C-1 and/or at C-6, as well as a fluorine atom at C-9α and/or a methyl group at C-16α. Our invention also includes the esters of such compounds formed by esterifying their primary hydroxyl groups with radicals of carboxylic acids of up to 12 carbon atoms, which compounds are potent anti-inflammatory agents of glycogenic, catabolic, thymolytic, anti-estrogenic and anti-androgenic activity.

The compounds which are the object of the present invention, are represented by the following formulas:

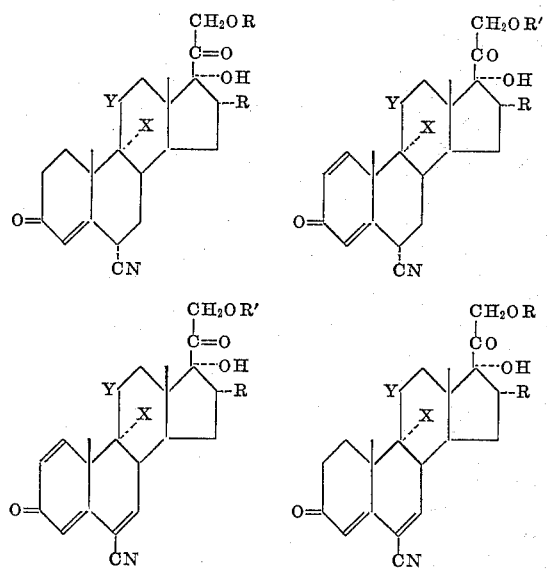

in which X represents a member of the group consisting of hydrogen and fluorine, Y is an arrangement selected from the group consisting of =O and

R is a member of the group consisting of hydrogen and methyl, R' is a hydrogen atom or the radical of any hydrocarbon carboxylic acid of up to about 12 carbon atoms, of straight, branched, cyclic or mixed aliphatic-cyclic chain and which may be substituted in their molecule with functional groups such as hydroxyl, acyloxy, methoxy or halogen. Typical such esters are the acetates, propionates, butyrates, hemisuccinates, enanthates, caproates, benzoates, trimethylacetates, phenoxyacetates, cyclopentylpropionates, phenylpropionates and β-chloropropionates. In the compounds saturated between C-6 and C-7 the cyano group occupies the α position.

As starting materials for the production of the above-described new compounds, there were used the 3-alkyleneketal-5α,6α-oxido-17,20;20,21-bis - methylenedioxy derivatives of cortisone, cortisol, 16α-methyl-cortisone, 16α-methyl-cortisol, and the 9α-fluoro analogs of the aforesaid compounds. These 3-alkyleneketal-5α,6α-oxido-17,20;20,21-bis-methylenedioxy derivatives were obtained from the corresponding 17,20;20,21-bis-methylenedioxy derivatives by conventional process steps. The last-mentioned bis-methylenedioxy derivatives are obtained by the method described by Sarett et al. in J.A.C.S., 80, p. 1518 (1958), from the corresponding basic compounds described, for instance, by Fried et al. in J.A.C.S., 76, p. 1455 (1954), Sarett et al. in J.A.C.S., 80, p. 3160 et seq. (1958), and in the copending patent application Serial No. 789,248 filed January 27, 1959.

The following reaction diagram illustrates the above mentioned preparation of the starting materials I as well as the further treatment of the latter according to the process of the present invention:

REACTION DIAGRAM

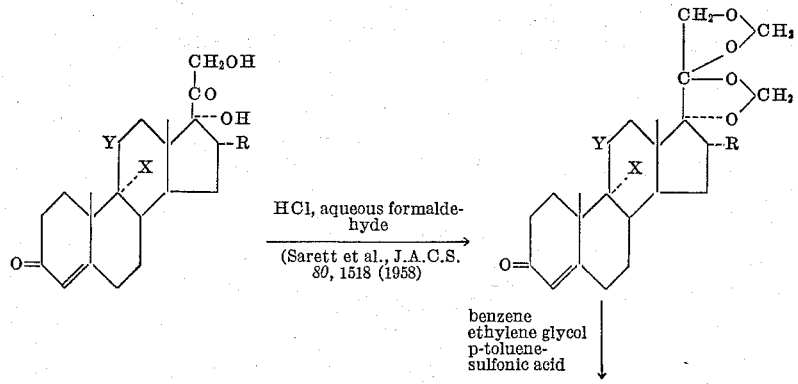

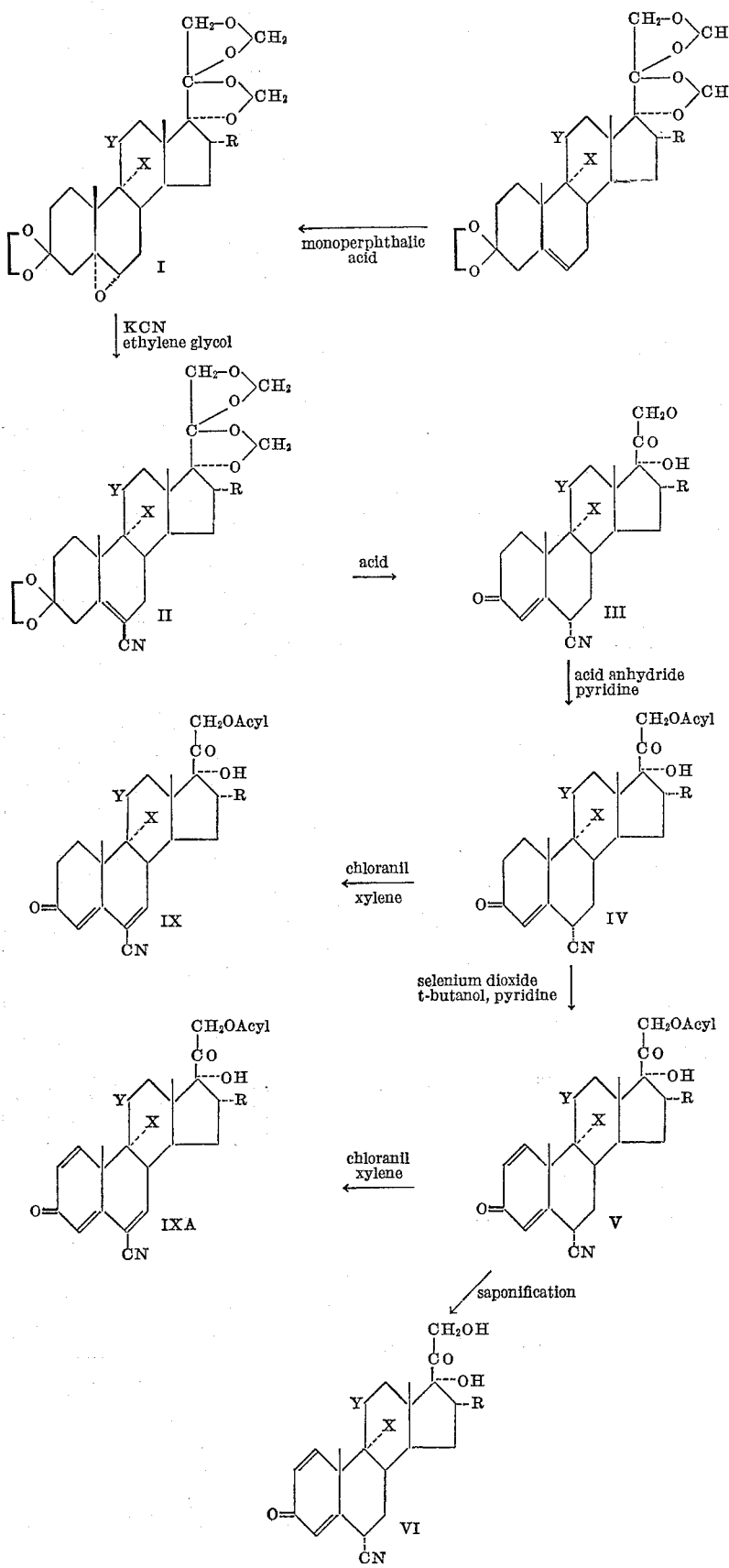

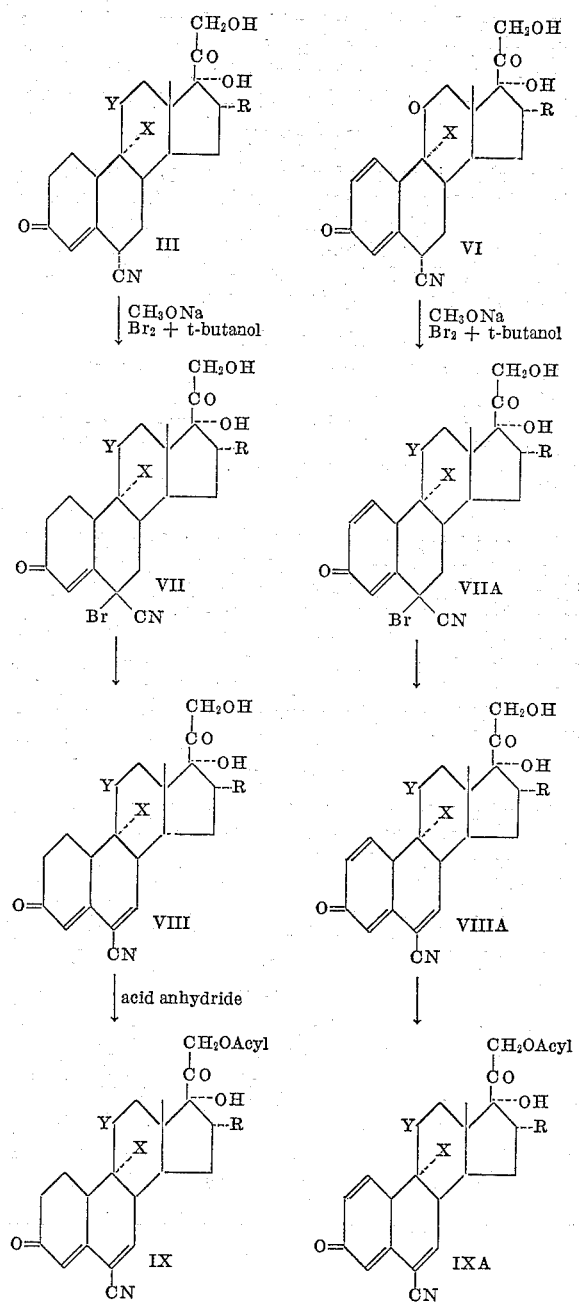

As shown in the above reaction diagram the starting compounds I prepared as described hereinbefore and being preferably the 3-ethylenedioxy derivatives are refluxed with an excess of potassium cyanide in mixture with ethylene glycol and thus there are obtained the respective 6-cyano-$\Delta^5$-compounds (II). Upon acid treatment the bis-methylenedioxy and ketal groups are hydrolyzed and there are obtained 6α-cyano-cortisone, 6α-cyano-cortisol or the corresponding 9α-fluorinated and/or 16α-methylated analogs (III), which exist in equilibrium with their 3-enol forms.

By treatment with the anhydride of carboxylic acid having up to about 12 carbons atoms, in pyridine solution, there are prepared the respective 21-esters (IV). Upon subsequent treatment with selenium dioxide under reflux in t-butanol, in the presence of catalytic amounts of pyridine and under an atmosphere of nitrogen there can be introduced an additional double bond between C–1 and C–2 and the corresponding 21-esters of 6α-cyano-prednisone or 6α-cyano-prednisolone (V) are obtained.

By treatment of the above esterified dienes with me-thanolic sodium methoxide or potassium hydroxide solution at low temperature and under an atmosphere of nitrogen, there are obtained the free 6α-cyano-prednisone or 6α-cyano-prednisolone (VI).

For introducing into the above-described 6α-cyano-$\Delta^4$- and $\Delta^{1,4}$- compounds an additional double bond between C–6 and C–7, they are first treated with 1.1 molar equivalents of sodium methoxide; the resulting 6-sodio-6-cyano is then reacted with 1.1 molar equivalents of bromine in mixture with t-butanol. Thus, there are produced 6-bromo-6-cyano-cortisone, 6-bromo-6-cyano-hydrocortisone, 6-bromo-6-cyano-prednisone and 6-bromo-6-cyano-prednisolone (VII, VIIA). The compounds of Formulas VII and VIIA, respectively, are these dehydrobrominated by reaction with calcium carbonate in mixture with dimethylformamide or by refluxing with collidine; thus, there are obtained compounds having the general Formula VIII such as 6-cyano-$\Delta^{4,6}$-pregnadien-17α,21-diol-3,11,20-trione, and 6-cyano-$\Delta^{4,6}$-pregnadiene-11β,17α,21-triol-3,20-dione from intermediates VII, and compounds having the general Formula VIIIA such as 6-cyano-$\Delta^{1,4,6}$-pregnatriene-17α,21-diol-3,11,20-trione and 6-cyano-$\Delta^{1,4,6}$-pregnatriene-11β,17α,21-triol-3,20-dione from intermediates VIIA.

The above described reactions may be carried out equally well with compounds in which X and R are hydrogen, or with the corresponding analog compounds having a fluorine substituent at C–9α and/or a methyl group at C–16.

By the aforementioned reaction with the anhydride of carboxylic acid of up to 12 carbon atoms in pyridine solution, the hydroxyl group at C–21 of all of the compounds heretofore set forth can be esterified so as to produce the corresponding esters of general Formulas IV, VI, IX and IXA, respectively.

Alternatively, the additional double bond between C–6 and C–7 may be introduced by refluxing the 21-esters of the $\Delta^4$- and $\Delta^{1,4}$-6α-cyano-hormones with chloranil in mixture with xylene.

The anhydrides used for the esterification at C–21 may be derived from any carboxylic acid of up to 12 carbon atoms, saturated or unsaturated, of straight, branched, cyclic or mixed aliphatic-cyclic chain, with or without functional substituents such as hydroxyl, acyloxy, methoxy, halogen or other groups.

To those skilled in the art it is obvious that the reactions described in the examples given hereinafter may be modified within wide limits, both with respect to the reagents and solvents employed, as well as with respect to the conditions under which the reactions are carried out. For example, instead of ethyleneglycol there may be employed propyleneglycol, to produce as an intermediate a cyclopropyleneketal. The subsequent acid hydrolysis of the ether group at C–3 and of the bis-methylenedioxy grouping may be effected by a treatment with dry hydrogen chloride in glacial acetic acid; the introduction of an additional double bond betwen C–1 and C–2 may also be effected by microbiological methods, such as incubation with species of Corynebacterium simplex or of Septomyxa known to be suitable for this purpose; for the bromination at C–6 there may be used instead of t-butanol another solvent inert to this reaction such as chloroform. The following examples serve to illustrate our invention without restricting its scope.

*Example I*

17,20;20,21 - bis - methylenedioxy - $\Delta^4$ - pregnene-3,11-dione was prepared from cortisone according to the method of Sarett et al. (J.A.C.S., 80, 1518 (1958)), that is, by treatment of a chloroform solution of the steroid with aqueous concentrated formaldehyde and concentrated hydrochloric acid at room temperature for 48 hours.

A mixture of 5 g. of 17,20;20,21-bis-methylenedioxy-$\Delta^4$-pregnene-3,11-dione, 300 cc. of anhydrous benzene, 35 cc. of ethyleneglycol and 250 mg. of p-toluenesulfonic acid monohydrate was refluxed for 12 hours with the use of a water separator; the cooled mixture was treated with 50 cc. of a 2 N aqueous solution of sodium carbonate and 500 cc. of water and the organic layer was separated, washed with water, dried over anhydrous sodium sulfate and the benzene was evaporated under reduced pressure. There was thus obtained 3-ethylenedioxy-17,20;20,21-bis-methylenedioxy-$\Delta^4$-pregnen-11-one in crude form, which was used as such for the next stage, without further purification. The pure compound may be obtained by chromatography on neutral alumina.

The above crude compound was dissolved in 100 cc. of chloroform, cooled to 0° C. and treated with an ether solution of 1.2 molar equivalents of monoperphthalic acid; the mixture was allowed to react at room temperature in the dark for 16 hours, then diluted with water and the organic layer was separated, washed with water, dried over anhydrous sodium sulfate and the solvent was evaporated under reduced pressure. By chromatography on neutral alumina there was obtained 3-ethylenedioxy-17,20;20,21 - bis - methylenedioxy-5$\alpha$,6$\alpha$-oxido-pregnan-11-one (I).

A mixture of 5 g. of 3-ethylenedioxy-17,20;20,21-bis-methylenedioxy-5$\alpha$,6$\alpha$-oxido-pregnan-11-one, 10 g. of potassium cyanide and 200 cc. of ethyleneglycol was refluxed for one and a half hours, poured into ice water and the precipitate consisting of 3-ethylenedioxy-6-cyano-17,20;20,21 - bis - methylenedioxy-$\Delta^5$-pregnen-11-one (II) was collected by filtration.

The above compound was heated with 100 cc. of 60% formic acid on the steam bath for 1 hour, cooled, diluted with water and the precipitate was collected, washed with water, dried and recrystallized from acetone-hexane, thus affording the pure 6$\alpha$-cyano-cortisone (III).

Example II

A solution of 5 g. of the $\Delta^5$-compound obtained in accordance with Example I in 100 cc. of 50% acetic acid was heated at 100° C. for 7 hours. The crude product was isolated by dilution with water and filtration of the precipitate; the dried product was treated with 5 cc. of acetic anhydride and 30 cc. of pyridine and kept for 2 hours at room temperature. After diluting with water the mixture was heated on the steam bath for half an hour, cooled and the precipitate was collected, washed with water, dried and recrystallized from acetone-hexane, thus yielding 6$\alpha$-cyano-cortisone 21-acetate.

1 g. of 6$\alpha$-cyano-cortisone 21-acetate was suspended in 10 cc. of absolute methanol, cooled to 0° C. and mixed with a cold solution of sodium methoxide prepared by dissolving 60 mg. of sodium in 10 cc. of absolute methanol. The mixture was stirred for 1 hour at a temperature around 0° C. and under an atmosphere of nitrogen and then poured into 100 cc. of aqueous saturated sodium chloride solution containing a few drops of acetic acid; the precipitate was collected, washed with water, dried and recrystallized from acetone-hexane. There was thus obtained the free 6$\alpha$-cyano-cortisone, identical with the final compound of Example I.

Example III

Example I is repeated with cortisol (hydrocortisone) as the starting material and there is produced the starting intermediary 3-ethylenedioxy-5$\alpha$,6$\alpha$-oxido-17,20;20,21-bis-methylene-dioxy-pregnan - 11 - ol, and finally 6$\alpha$-cyano-cortisol.

Example IV

Example I is repeated with 9$\alpha$-fluoro-cortisone (Fried et al., J.A.C.S., 76, 1455 (1954)), as the starting material and there is produced the starting intermediary 3-ethylenedioxy-5$\alpha$,6$\alpha$-oxido - 9$\alpha$ - fluoro - 17,20;20,21-bis-methylenedioxy-pregnan-11-one and finally 6$\alpha$-cyano-9$\alpha$-fluoro-cortisone.

Example V

Example I is repeated with 9$\alpha$-fluoro-cortisol (see Fried et al. supra) and there is obtained 6$\alpha$-cyano-9$\alpha$-fluoro - cortisol via the corresponding 3 - ethylenedioxy-5$\alpha$,6$\alpha$-oxido-17,20;20,21-bis-methylenedioxy intermediate.

Example VI

Example I is repeated with 16$\alpha$-methyl-cortisone obtained by conventional saponification of the 21-acetate there (Sarett et al., J.A.C.S., 80, p. 3160 et seq., (1958)) and there is produced 6$\alpha$-cyano-16$\alpha$-methyl-cortisone via the corresponding 3-ethylenedioxy - 5$\alpha$,6$\alpha$ - oxido - 17,20; 20,21-bis-methylenedioxy intermediate.

Example VII

Example I is repeated with 16$\alpha$-methyl-cortisol (Sarett et al., J.A.C.S., 80, p. 3162 (1958)), and there are obtained the intermediate 3 - ethylenedioxy - 5$\alpha$,6$\alpha$ - oxide-17,20;20,21-bis-methylenedioxy derivative and ultimately 6$\alpha$-cyano-16$\alpha$-methyl-cortisol.

Example VIII

Example I is repeated with 9$\alpha$-fluoro-16$\alpha$-methyl-cortisone obtained from 16$\alpha$-methyl-9$\alpha$-fluoro-cortisol 21-acetate (Sarett et al., J.A.C.S., 80, p. 3162 (1958)), by conventional oxidation with chromic acid and subsequent conventional saponification as described in the copending application Serial No. 789,248 filed January 27, 1959; there are obtained the 3-ethylenedioxy-5$\alpha$,6$\alpha$-oxido-17,20;20,21-bis-methylenedioxy derivative as an intermediate and finally 6$\alpha$-cyano-9$\alpha$-fluoro-16$\alpha$-methyl-cortisone.

Example IX

Example I is repeated with 16$\alpha$-methyl-9$\alpha$-fluoro-$\Delta^4$-pregnene-11$\beta$,17$\alpha$,21 - triol - 3,20-dione (16$\alpha$ - methyl-9$\alpha$-fluoro-cortisol) obtained by conventional saponification of the 21-acetate mentioned in the preceding example. There are obtained the intermediate 3-ethylenedioxy-5$\alpha$,6$\alpha$-oxido-17,20;20,21 - bis - methylenedioxy derivative and finally 6$\alpha$-cyano-9$\alpha$-fluoro-16$\alpha$-methyl cortisol.

Example X

By treatment of the bis-methylenedioxy-3-ethylenedioxy-5$\alpha$,6$\alpha$-epoxides of the preceding Examples II to IX with potassium cyanide and ethyleneglycol, followed by treatment with formic acid and then with acetic acid and acetic anhydride, in accordance with the method of Example II, there were obtained as intermediates the 21-acetates of the 6$\alpha$-cyano-hormones as listed below:

| | Bis-methylenedioxy-3-ethylenedioxy-5$\alpha$,6$\alpha$-oxido derivative of Example No.— | Resulting Intermediate |
|---|---|---|
| (a) | III | 6$\alpha$-cyano-cortisol 21-acetate. |
| (b) | IV | 6$\alpha$-cyano-9$\alpha$-fluoro-cortisone 21-acetate. |
| (c) | V | 6$\alpha$-cyano-9$\alpha$-fluoro-cortisol 21-acetate. |
| (d) | VI | 6$\alpha$-cyano-16$\alpha$-methyl-cortisone 21-acetate. |
| (e) | VII | 6$\alpha$-cyano-16$\alpha$-methyl-cortisol 21-acetate. |
| (f) | VIII | 6$\alpha$ - cyano - 9$\alpha$ - fluoro - 16$\alpha$ - methylcortisone 21-acetate. |
| (g) | IX | 6$\alpha$-cyano- 9$\alpha$ - fluoro - 16$\alpha$- methylcortisol 21-acetate. |

Example XI

By following the method of acetylation described in Example II, the 6$\alpha$-cyano-compounds resulting from the method of Examples I and III to IX were treated with several anhydrides of carboxylic acids of up to 12 carbon atoms, to produce the 21-esters of the respective 6$\alpha$-cyano-hormones.

Among other compounds there were prepared the following 21-esters listed below from the cited 6$\alpha$-cyano hormones and the respective acid anhydride:

| 6α-cyano hormone produced according to Example No.— | Resulting 21-Ester |
|---|---|
| (a) III | 6α-cyano-cortisol 21-propionate. |
| (b) V | 6α-cyano-9α-fluoro-cortisol 21-propionate. |
| (c) IX | 6α-cyano-9α-fluoro-16α-methylcortisol 21-propionate. |
| (d) I | 6α-cyano-cortisone 21-cyclopentyl-propionate. |
| (e) VI | 6α-cyano-16α-methyl-cortisone 21-cyclopentylpropionate. |
| (f) V | 6α-cyano-9α-fluoro-cortisol 21-caproate. |

For the esterification with radicals of polycarboxylic acids the relative amount of the anhydride was increased and the reaction time was extended to 16 hours.

Example XII

A mixture of 5 g. of 6α-cyano-cortisone 21-acetate produced as described in Example II, 250 cc. of t-butanol, 0.5 cc. of pyridine and 1.6 g. of recently sublimed selenium dioxide was refluxed under an atmosphere of nitrogen for 48 hours and then filtered through celite, washing the filter with a little hot ethyl acetate; the combined filtrate and washings was evaporated to dryness under reduced pressure and the residue was dissolved in acetone, refluxed with charcoal for 1 hour and filtered. The acetone was evaporated and the residue was purified by chromatography on neutral alumina. There was thus obtained the 21-acetate of 6α-cyano-prednisone (VI).

Example XIII

By the method of Example XII the 21-propionate of 6α-cyano-9α-fluoro-cortisol (Example Xb) was converted into the 21-propionate of 6α-cyano-9α-fluoro-prednisolone.

Example XIV

By the method described in Example XII, the 21-cyclopentyl-propionate of 16α-methyl-6α-cyano-cortisone was converted into the 21-cyclopentylpropionate of 6α-cyano-16α-methyl-prednisone.

Example XV

By the method described in Example XII, the 21-acetate of 16α-methyl-6α-cyano-9α-fluoro-hydrocortisone was converted into the 21-acetate of 16α-methyl-6α-cyano-9α-fluoro-prednisolone.

Example XVI

A solution of 3 g. of 6α-cyano-cortisone, obtained according to Example I, in 90 cc. of t-butanol added to 1.1 molar equivalents of sodium methoxide prepared by dissolving the corresponding amount of sodium metal in absolute methanol and evaporating the methanol under anhydrous conditions. The mixture was stirred at room temperature for 30 minutes and then a solution of 1.1 molar equivalents of bromine in 30 cc. of t-butanol was added little by little, under stirring and maintaining the temperature below 15° C. The mixture was kept for half an hour at room temperature, diluted with water and the precipitate was collected, washed with water and dried in vacuo. There was thus obtained 6-cyano-6-bromo-cortisone (VII) which was used for the next step without further purification. A pure sample of the cyano-bromo compound was obtained by recrystallization from acetone-hexane at low temperature.

A solution of 3 g. of the above crude compound in 20 cc. of dimethylformamide was added to a suspension of 1.5 g. of calcium carbonate in 30 cc. of dimethylformamide. The mixture was refluxed for 15 minutes, concentrated to about 20 cc. under reduced pressure, cooled, poured into aqueous saturated sodium chloride solution and the precipitate was collected, washed with water, dried and recrystallized from acetone-hexane. There was thus obtained 6-cyano-$\Delta^{4,6}$-pregnadiene-17α,21-diol-3,11,20-trione (VIII).

Example XVII

A mixture of the crude 6-cyano-6-bromo-cortisone (VII) of the preceding example and 50 cc. of collidine was refluxed for 2 hours, cooled and the collidine hydrobromide was removed by filtration and washed with ether; the filtrate and washings were combined, diluted with water and more ether and the organic layer was separated, washed with dilute hydrochloric acid, and then with water and the solvent was evaporated. Crystallization of the residue from acetone-hexane furnished 6-cyano-$\Delta^{4,6}$-pregnadiene-17α,21-diol-3,11,20-trione(VIII), identical with the final compound of the preceding example.

Example XVIII 5 g. of 6α-cyano-9α-fluoro-prednisolone obtained by conventional saponification of the 21-propionate which was produced as described in Example XIII, was subjected to the reaction with sodium methoxide and then with bromine, in accordance with the procedure described in Example XVI. There was thus obtained 6-cyano-6-bromo-9α-fluoro-prednisolone which was separated into two portions. One was dehydrobrominated by reaction with calcium carbonate while the other was dehydrobrominated by the reaction with collidine, in accordance with the method of Examples XVI and XVII. In both cases there was obtained 6-cyano-9α-fluoro-$\Delta^{1,4,6}$-pregnatriene-11β,17α,21-triol-3,20-dione(VIIIA).

Example XIX

By following the method described in Examples XVII and XVIII, respectively, the $\Delta^4$ and $\Delta^{1,4}$-compounds listed below were converted into the following compounds:

| | 6-cyano-6-bromo compound of— | Resulting Compound |
|---|---|---|
| (a) | 16α-methyl-cortisone | 16α-methyl-6-cyano-$\Delta^{4,6}$-pregnadiene-17α, 21-diol-3, 11, 20-dione. |
| (b) | 16α-methyl-9α-fluoro-cortisol. | 16α-methyl-6-cyano-9α-fluoro-$\Delta^{1,4,6}$-pregnatriene-11β, 17α, 21-triol-3, 20-dione. |
| (c) | 9α-fluoro-cortisol | 6-cyano-9α-fluoro-$\Delta^{4,6}$-pregnadiene-11β, 17α, 21-triol-3, 20-dione. |
| (d) | cortisol | 6-cyano-$\Delta^{1,4,6}$-pregnatriene-11β, 17α, 21-triol-3, 20-dione. |
| (e) | cortisone | 6-cyano-$\Delta^{1,4,6}$-pregnatriene-17α, 21-diol-3, 11, 20-trione. |

Example XX

The hydroxyl group at C–21 of the compounds obtained according to Example XIXa–e as well as that of the final compounds of Examples XVII and XVIII was esterfied in accordance with the method described in Example II. There were thus prepared their 21-acetates, propionates, trimethylacetates and cyclopentylpropionates and others as listed below.

| | Compound to be esterified obtained from Example— | Resulting Ester |
|---|---|---|
| (a) | XVII | 6-cyano-$\Delta^6$-cortisone 21-acetate. |
| (b) | XVIII | 6-cyano-9α-fluoro-$\Delta^6$-prednisolone 21-propionate |
| (c) | XIX(a) | 6-cyano-16α-methyl-$\Delta^6$-cortisone 21-trimethyl-acetate. |
| (d) | XIX(b) | 6-cyano-9α-fluoro-16α-methyl-$\Delta^6$-prednisolone 21 cyclopentylpropionate |
| (e) | XIX(c) | 6-cyano-9α-fluoro-$\Delta^6$-cortisol 21-hemisuccinate. |
| (f) | XIX(d) | 6-cyano-$\Delta^6$-prednisolone 21-acetate. |
| (g) | XIX(e) | 6-cyano-$\Delta^6$-prednisone 21-caproate. |
| (h) | XVII | 6-cyano-$\Delta^6$-cortisone 21-enanthate. |
| (i) | XIX(e) | 6-cyano-$\Delta^6$-prednisone 21-butyrate. |
| (j) | XIX(c) | 6-cyano-9α-fluoro-$\Delta^6$-cortisol 21-benzoate. |
| (k) | XVIII | 6-cyano-9α-fluoro-$\Delta^6$-prednisolone 21-phenoxyacetate. |
| (l) | XVII | 6-cyano-$\Delta^6$-cortisone 21-chloropropionate. |
| (m) | XVII | 6-cyano-$\Delta^6$-cortisone 21-phenyl-propionate. |

It should be mentioned that the above-described reactions may also be applied to cortexolone (substance "S") or its 16α-methylanalog, followed by introduction of an oxygen function at C-11 by biological methods, for example by incubation with bovine adrenal glands. The substituent at C-9α may be chlorine or bromine instead of fluorine; instead of the methyl group at C-16α there may be present another lower alkyl group at this position.

It should also be mentioned that the 6-cyano-hormones, according to the present invention, may be subjected to the known treatments for transformation of the cyano group. For example, the cyano group may be transformed by alkaline treatment, after adequate protection of the dihydroxyacetone side chain at C-17, into the carboxyl group; in turn, the latter may be converted into the carboxymethyl group, which by reduction furnishes the respective 6-hydroxymethyl-compounds.

We claim:

1. A 6-cyano-corticoid derivative of the general formula:

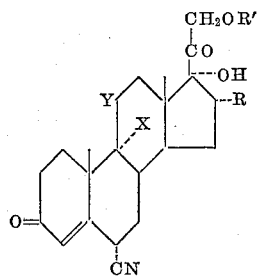

in which X is a member of the group consisting of hydrogen and fluorine, Y is an arrangement selected from the group consisting of =O and

R is a member of the group consisting of hydrogen and methyl, and R' is a member of the group consisting of hydrogen and acyl radicals derived from a hydrocarbon carboxylic acid having up to about 12 carbon atoms.

2. A 6-cyano-Δ$^1$-corticoid derivative having the general formula:

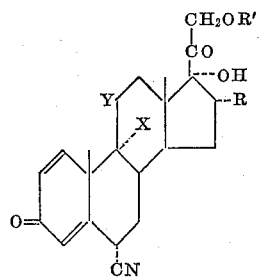

in which X is a member of the group consisting of hydrogen and fluorine, Y is an arrangement selected from the group consisting of =O and

R is a member of the group consisting of hydrogen and methyl, and R' is a member of the group consisting of hydrogen and acyl radicals derived from a hydrocarbon carboxylic acid having up to about 12 carbon atoms.

3. A 6-cyano-Δ$^6$-corticoid derivative having the general formula:

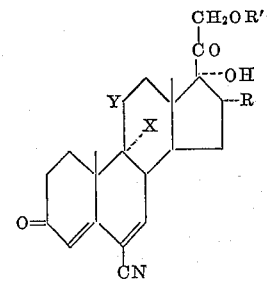

in which X is a member of the group consisting of hydrogen and fluorine, Y is an arrangement selected from the group consisting of =O and

R is a member of the group consisting of hydrogen and methyl, and R' is a member of the group consisting of hydrogen and acyl radicals derived from a hydrocarbon carboxylic acid having up to about 12 carbon atoms.

4. A 6-cyano-Δ$^{1,6}$-corticoid derivative having the general formula:

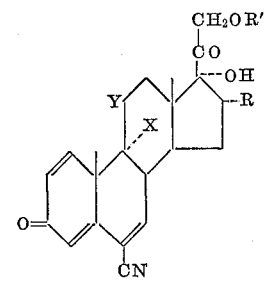

in which X is a member of the group consisting of hydrogen and fluorine, Y is an arrangement selected from the group consisting of =O and

R is a member of the group consisting of hydrogen and methyl, and R' is a member of the group consisting of hydrogen and acyl radicals derived from a hydrocarbon carboxylic acid having up to about 12 carbon atoms.

5. A member of the group consisting of 6α-cyano-cortisone and the 21-esters thereof with a hydrocarbon carboxylic acid having up to about 12 carbon atoms.

6. A member of the group consisting of 6α-cyano-cortisol and the 21-esters thereof with a hydrocarbon carboxylic acid having up to about 12 carbon atoms.

7. A member of the group consisting of 6α-cyano-prednisone and the 21-esters thereof with a hydrocarbon carboxylic acid having up to about 12 carbon atoms.

8. A member of the group consisting of 6α-cyano-prednisolone and the 21-esters thereof with a hydrocarbon carboxylic acid having up to about 12 carbon atoms.

9. A member of the group consisting of 6α-cyano-9α-fluoro-cortisone and the 21-esters thereof with a hydrocarbon carboxylic acid having up to about 12 carbon atoms.

10. A member of the group consisting of 6α-cyano-9α-fluoro-cortisol and the 21 esters thereof with a hydrocarbon carboxylic acid having up to about 12 carbon atoms.

11. A member of the group consisting of 6α-cyano-9α-fluoro-prednisone and the 21 esters thereof with a hydrocarbon carboxylic acid having up to about 12 carbon atoms.

12. A member of the group consisting of 6α-cyano-9α-fluoro-prednisolone.

13. A member of the group consisting of 16α-methyl-6α-cyano-cortisone and the 21 esters thereof with a hydrocarbon carboxylic acid having up to about 12 carbon atoms.

14. A member of the group consisting of 16α-methyl-6α-cyano-cortisol and the 21 esters thereof with a hydrocarbon carboxylic acid having up to about 12 carbon atoms.

15. A member of the group consisting of 16α-methyl-6α-cyano-prednisone and the 21 esters thereof with a hydrocarbon carboxylic acid having up to about 12 carbon atoms.

16. A member of the group consisting of 16α-methyl-6α-cyano-prednisolone and the 21 esters thereof with a hydrocarbon carboxylic acid having up to about 12 carbon atoms.

17. A member of the group consisting of 16α-methyl-6α-cyano-9α-fluoro-cortisone and the 21 esters thereof with a hydrocarbon carboxylic acid having up to about 12 carbon atoms.

18. A member of the group consisting of 16α-methyl-6α-cyano-9α-fluoro-cortisol and the 21 esters thereof with a hydrocarbon carboxylic acid having up to about 12 carbon atoms.

19. A member of the group consisting of 16α-methyl-6α-cyano-9α-fluoro-prednisone and the 21 esters thereof with a hydrocarbon carboxylic acid having up to about 12 carbon atoms.

20. A member of the group consisting of 16α-methyl-6α-cyano-9α-fluoro-prednisolone and the 21 esters thereof with a hydrocarbon carboxylic acid having up to about 12 carbon atoms.

21. A 6-cyano-6-bromo-cortical derivative having the general formula:

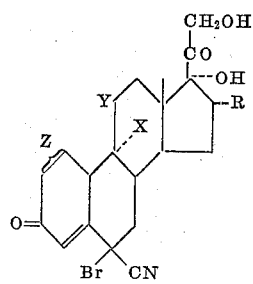

wherein R is a member of the group consisting of hydrogen and methyl, X is a member of the group consisting of hydrogen and fluorine, Y is an arrangement selected from the group consisting of =O and

and Z represents a carbon-to-carbon linkage selected from the group consisting of C—C and C=C.

References Cited in the file of this patent
UNITED STATES PATENTS 2,841,531    Wettstein et al. _____ July 1, 1958
2,897,218    Sebech et al. _____ July 28, 1959

OTHER REFERENCES

Fried et al.: Jour. Amer. Chem. Soc. (1959), vol. 81, pp. 1236–37.